United States Patent [19]
Montgomery

[11] 3,915,491
[45] Oct. 28, 1975

[54] REMOTE CONTROLLED GAS TANK LOCK

[76] Inventor: Tom C. Montgomery, Box 421, Big Springs, Tex. 79720

[22] Filed: June 21, 1974

[21] Appl. No.: 481,603

[52] U.S. Cl................ 296/1 C; 280/5 A; 292/122; 292/201
[51] Int. Cl.² ............................................ B60T 9/02
[58] Field of Search........ 296/1 C; 292/201, 341.16, 292/DIG. 72, 122; 280/5 A

[56] References Cited
UNITED STATES PATENTS

| | | | |
|---|---|---|---|
| 2,035,895 | 3/1936 | Kelley | 296/1 C |
| 2,325,225 | 7/1943 | Burke | 292/201 |
| 2,863,671 | 12/1958 | Scott | 296/1 C |
| 3,151,698 | 10/1964 | Pollock | 292/341.16 |
| 3,774,422 | 11/1973 | Hogan et al. | 292/341.16 |

Primary Examiner—Robert J. Spar
Assistant Examiner—Gary Auton
Attorney, Agent, or Firm—Howard E. Moore; Gerald G. Crutsinger

[57] ABSTRACT

An apparatus to lock a cover, such as a license plate holder, disposed over a gasoline cap in closed position to prevent access to the gas tank cap to protect against theft of the gasoline. The cover member or license plate has a shaft extending therefrom which is latched to a pivoted arm contained in a housing positioned behind the license plate cover. The pivoted arm is spring urged into a notch in the shaft and releases the shaft upon activation of a solenoid which pulls the engaging end of the pivoted arm away from the shaft. A spring located in the front of the housing urges the shaft outwardly when the pivoted arm is released therefrom thereby pushing the cover outwardly to prevent relatching of the shaft when the solenoid is de-energized.

5 Claims, 3 Drawing Figures

U.S. Patent    Oct. 28, 1975    3,915,491
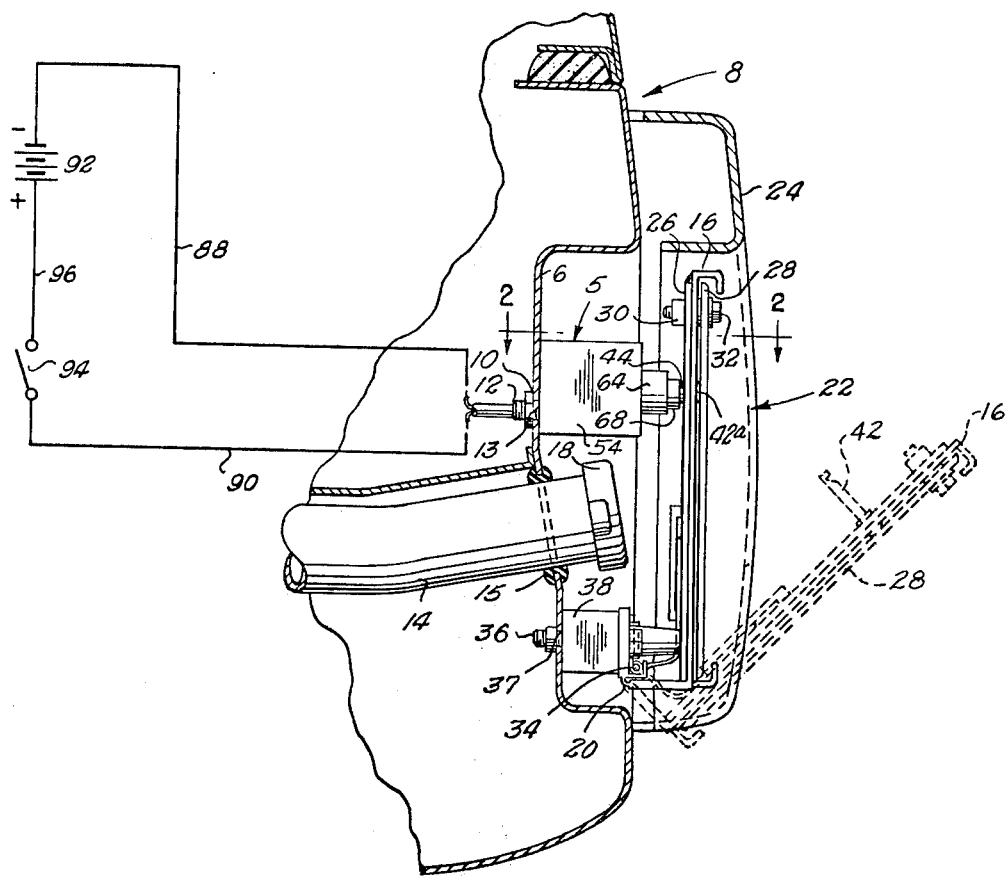
Fig. 1
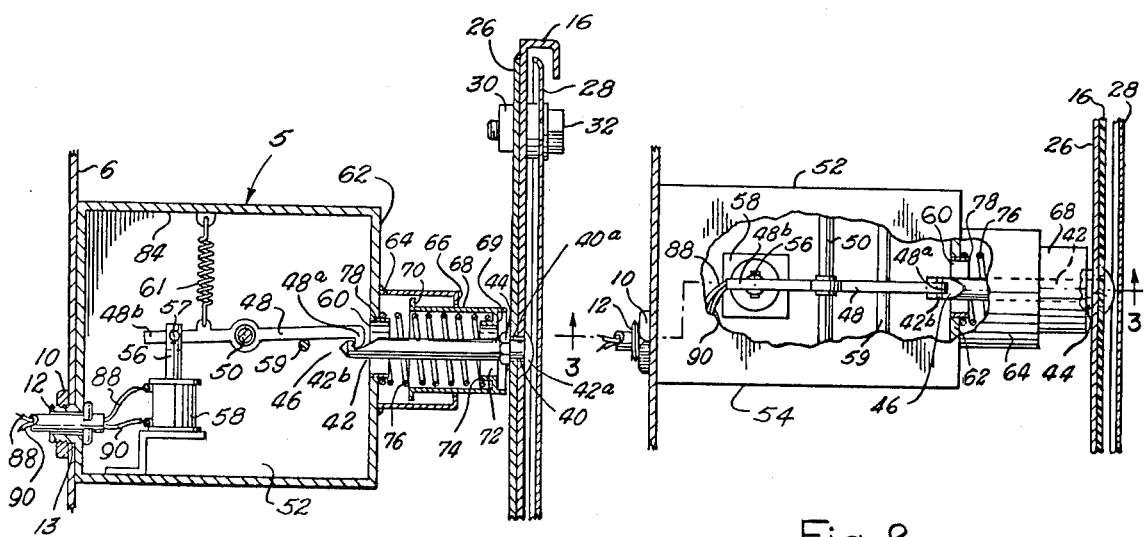
Fig. 3                    Fig. 2

REMOTE CONTROLLED GAS TANK LOCK

BACKGROUND OF INVENTION

Devices heretofore developed for locking gas tank caps have usually involved a lock within the cap itself. This requires carrying an extra key to open the gas tank for refilling. It also allows those who have the skill to pick the lock to gain access to the gas tank to steal the gasoline.

Due to the rising cost and scarcity of gasoline, it is desirable that the public be protected from unauthorized access to gasoline tanks.

Heretofore, no anti-theft devices have taken advantage of existing apparatus on the automobile to prevent theft of gasoline.

SUMMARY OF THE INVENTION

I have devised a locking device for gas tanks on an automobile having a pivoted cover such as a license plate holder positioned over the gasoline tank cap. A remote control switch is located in the interior of the automobile which operates a solenoid controlled, spring urged latch to release the cover so that the cover can be moved out of the way, making the gas tank cap accessible. The latch is located adjacent the gas tank spout and behind the cover so that the latch is inaccessible from outside the cover.

A primary object of the invention is to provide a remote control lock to prevent theft of gasoline from an automobile gasoline tank.

Another object of the invention is to utilize equipment already found on the automobile to prevent unauthorized access to a gasoline tank.

A further object of the invention is to lock the cover over a gasoline tank cap in closed position which may be only released from the interior of the car.

A still further object of the invention is to prevent access to the cap on a gasoline tank of an automobile without the necessity of providing a lock in association with the cap, thus eliminating the necessity for a key to open same.

A still further object of the invention is to provide a gasoline tank locking device which is easy and simple to install and maintain.

Other and further objects of the invention will become apparent upon referring to the detailed description hereinafter following to the drawing annexed hereto.

DESCRIPTION OF DRAWING

Drawings of a preferred embodiment of the invention are annexed hereto so that the invention may be better and more fully understood, in which:

FIG. 1 is a cross-sectional view of the locking device as mounted on typical vehicle and showing a diagrammatic view of the electrical system;

FIG. 2 is a cross-sectional view taken along line 2—2 of FIG. 1; and

FIG. 3 is a cross-sectional view taken along line 3—3 of FIG. 2.

Numeral references are employed to designate the parts shown in the drawings and like numerals designate like parts throughout the various figures of the drawings.

DESCRIPTION OF A PREFERRED EMBODIMENT

The numeral 5 generally designates the remotely controlled latch which as shown is secured to the rear body fender 6 of the vehicle 8 by a nut 10 threadedly secured to a threaded protrusion 12 of latch 5 which extends through passage 13 formed in the rear body fender 6. The latch 5 is secured adjacent to the gas tank spout 14, which protrudes through an opening 15 formed in the rear body fender 6, such that gas tank spout cover 16 is locked over the gas tank spout 14 to prevent removal of the gas tank cap 18. Cover 16 is preferably a rigid metallic plate.

As illustrated in FIG. 1 the gas tank spout cover 16 is pivotally secured by hinge 20 to vehicle 8 at the opening 22 formed in the rear bumper 24 of the vehicle. However, the configuration shown in FIG. 1 is for illustrative purposes only and it is not intended to limit application of the latch 5 to those vehicles having rear bumper gas tank openings 22. Vehicles having the gas tank spout positioned in other locations such as the rear quarter panel of makes of station wagons are also intended to be protected by the latch 5.

Cover 16 is reinforced by a backup plate 26 secured to the cover thereof by means such as welding to prevent entry into the gas tank cap 18 by bending the cover 16. In the configuration illustrated, a license plate 28 is secured to cover 16 by nut 30 and bolt 32 as a license plate is required by law in some jurisdictions to be visible from the rear.

Cover 16 is secured to hinge 20 by means of pin 34 so that the cover 16 may be moved to a closed position as shown in full outline of FIG. 1 or opened to the position shown in dashed lines. Hinge 20 is secured to the vehicle 8 by means of a bolt 36 which extends through hinge 20, spacer 38 and opening 37 in the rear body fender 6.

It should be readily appreciated that when cover 16 is in the closed position as shown in FIG. 1, the latch 5 is completely inaccessible due to the fact that a frame is formed by the bumper 24 around the sides of cover 16 where the opening 22 is formed making it inaccessible from the outer portion of the automobile when latch 5 is locked.

The cover 16 and backup plate 26 have coinciding apertures 40 and 40a therethrough to permit a smooth headed latch shaft 42 to extend therethrough which is held in position by lock nut 44 such that the head 42a of latch shaft 42 is positioned between the cover 16 and the license plate 28 and is completely inaccessible and out of view from the exterior of the vehicle 8. The shaft 42 has an end 42b with a notch 46 formed therein to latch the end of pivot arm 48 in the manner hereinafter described.

Pivot arm 48 has a deflected end 48a which engages the notch 46 to limit movement of shaft 42 along the longitudinal axis thereof. Pivot arm 48 is pivotally secured to pin 50 which is secured between the sidewalls 52 and 54 of the housing 5. End 48b of pivot arm 48 is pivotally secured to a solenoid core 56 by pin 57 such that when solenoid 58 is energized end 48b is pulled downwardly moving end 48a upwardly releasing shaft 42 from arm 48.

A stop 59 has opposite ends secured to sidewalls 52 and 54 of housing 5 and is positioned near end 48a of pivot arm 48. Spring 61 is secured between upper wall 84 of the housing 5 and end 48b of pivot arm 48 to urge end 48a in a clockwise direction as viewed in FIG. 3 to hold end 48a in engagement with shoulder 46a adjacent notch 46.

Stop 59 is positioned to limit downward movement of the end 48a of pivot arm 48 to a position adjacent end 42b of shaft 42. Movement of cover 16 from the position shown in dashed outline in FIG. 1 to the position shown in full outline moves end 42b of shaft 42 into engagement with the deflected end 48a of pivot arm 48. Inward movement of shaft 42 moves end 48a of pivot arm 48 upwardly and spring 61 urges end 48a downwardly into notch 46.

Shaft 42 extends through a passage 60 in the front wall 62 of the housing 5. A hollow tube 64 is welded or otherwise secured to and extends from front wall 62 of the housing and has an inwardly extending flange 66 formed on the end thereof. A sleeve 68 is telescopically disposed in tube 64 and has an outwardly extending flange 70 to limit outward movement of sleeve 68. Sleeve 68 is freely rotatable in tube 64 and about shaft 42 to prevent severing shaft 42 as by sawing.

Shaft 42 extends through opening 72 in an end plate 69 secured across the end of sleeve 68. Protrusion 74 extends about the periphery of opening 72 for supporting one end of spring 76, the other end of which is supported by extension 78 secured to the front 62 of the housing 5. When shaft 42 is released spring 76 exerts a force outwardly on sleeve 68 pushing shaft 42 outwardly with the cover 16.

As illustrated in FIGS. 1 and 3, electric lead 88 connects one side of solenoid 58 to the negative pole of battery 92. The other side of solenoid 58 is connected to a spring-biased, open switch 94 by lead 90. The other side of switch 94 is connected to the positive pole of battery 92 such that when switch 94 is closed solenoid 58 will be energized. Leads 88 and 90 extend through protrusion 12 into the interior of the luggage compartment 98 of the vehicle 8 such that they will be inaccessible from the outside of the vehicle 8.

Operation of the hereinbefore described apparatus is as follows:

To release shaft 42 from pivot arm 48, switch 94 is closed, completing a circuit through lead 90 to solenoid 58, energizing same.

Solenoid core 56 is pulled downwardly by the magnetic force exerted by solenoid 58, pulling end 48b downwardly and moving end 48a upwardly as pivot arm 48 rotates about shaft 50 thus releasing shaft 42. As end 48a disengages from notch 46 of shaft 42, spring 76 urges sleeve 68 outwardly, pushing cover 16 and shaft 42 outwardly so as to prevent re-engagement of the end 48a with notch 46 when solenoid 58 is de-energized. Cover 16 is then manually moved away from gas tank spout 14 to permit access to gas tank cap 18 to permit removal of same.

After refilling the gasoline tank and replacing gas cap 18 on gas tank spout 14, cover 16 is then moved upward manually and pushed forwardly. Shaft 42 passes through opening 72 and passage 60 in the front 62 of the housing 5. End 42b of shaft 42 then engages end 48a of pivot arm 48, moving same upwardly until end 48a engages notch 46. When end 48a engages notch 46, bolt 42 is then latched in place. Until solenoid 48 is energized again by depressing spring-loaded switch 94, cover 16 will remain locked in place and can only be moved outwardly by energizing solenoid 58.

From the foregoing it should be readily apparent that the preferred embodiment hereinbefore described accomplishes the objects of the invention hereinbefore discussed.

It should be appreciated that other and further embodiments of the invention may be devised without departing from the basic concept thereof.

Having described my invention, I claim:

1. In combination with a vehicle having a body with an opening therein; a fuel tank having an inlet passage accessible through said opening; a cover disposed over said opening; hinge means securing said cover to said vehicle; and lock means to lock said cover in closed position, said lock means comprising: a shaft; means securing said shaft to said cover; a housing having sidewalls and a frontwall, said frontwall having a passage extending therethrough; means securing said housing to the vehicle; a hollow sleeve; means rotatably securing a first end of said hollow sleeve to said frontwall such that said sleeve is moveable longitudinally relative to said housing, said shaft extending through said sleeve and through said passage extending through the frontwall of the housing; means on said sleeve to limit longitudinal movement of said sleeve toward said cover; an inwardly extending shoulder on said sleeve; a spring in said hollow sleeve having an end engageable with said shoulder to urge said shoulder toward said cover; a latch; means securing said latch in said housing such that said latch is moveable between a first position in locking engagement with said shaft and a second position disengaged from said shaft; an actuating means to move said latch to said second position.

2. The combination called for in claim 1 wherein said cover comprises a cover plate; and with the addition of a license plate secured to said cover plate.

3. The combination called for in claim 1 wherein said means rotatably securing said hollow sleeve to said frontwall of the housing comprises: a hollow tube; means securing a first end of said hollow tube to said frontwall about said passage, said hollow sleeve being telescopically disposed in said hollow tube; an inwardly extending shoulder adjacent a second end of said hollow tube; and wherein said means on said sleeve to limit longitudinal movement of said sleeve toward said cover comprises an outwardly extending shoulder on said sleeve moveable into engagement with said inwardly extending sleeve on said hollow tube.

4. The combination called for in claim 1 wherein said actuating means to move said latch to said second position comprises: a solenoid in said housing; means connecting said solenoid to said latch; and conductor means connected to said solenoid to selectively deliver electric current to said solenoid.

5. In a vehicle having a rear bumper with an opening therein, a gas tank carried by the vehicle, said gas tank having an inlet extending therethrough and positioned such that the bumper of the vehicle forms an opening around the inlet, the combination comprising: a cover; means pivotally securing said cover over said opening; a shaft having a notch formed therein attached to and extending from the cover inwardly through the opening; a latch arranged to extend into the notch to disengageably lock the cover in a closed position; means pivotally securing said latch to the vehicle; a solenoid having a core therein pivotally secured to the latch; and means to energize the solenoid to move said latch out of said notch in said shaft, wherein the means to pivotally secure the latch to the vehicle comprises: a housing having sidewalls and a frontwall, said frontwall having a passage extending therethrough; a hollow tube; means securing a first end of said hollow tube to said frontwall about said passage; a sleeve telescopically disposed in said hollow tube, said shaft extending through said sleeve and said tube; an inwardly extending shoulder on a second end of said hollow tube; an outwardly extending shoulder on a first end of said sleeve; and a spring in said hollow tube to urge said shoulder on said sleeve toward said shoulder on said hollow tube, said shaft extending through said sleeve and into engagement with said latch when in a locking position.

* * * * *